(12) United States Patent
Gotou et al.

(10) Patent No.: US 11,135,641 B2
(45) Date of Patent: Oct. 5, 2021

(54) VEHICLE WHEEL DISC AND MANUFACTURING METHOD OF VEHICLE WHEEL DISC

(71) Applicant: CENTRAL MOTOR WHEEL CO., LTD., Anjo (JP)

(72) Inventors: Naoki Gotou, Anjo (JP); Kazuna Tsuduki, Anjo (JP)

(73) Assignee: CENTRAL MOTOR WHEEL CO., LTD., Anjo (JP)

( * ) Notice: Subject to any disclaimer, the term of this patent is extended or adjusted under 35 U.S.C. 154(b) by 121 days.

(21) Appl. No.: 16/582,457

(22) Filed: Sep. 25, 2019

(65) Prior Publication Data

US 2020/0108435 A1 Apr. 9, 2020

(30) Foreign Application Priority Data

Oct. 9, 2018 (JP) .............................. JP2018-190573

(51) Int. Cl.
*B21D 53/30* (2006.01)
*B21D 22/16* (2006.01)
*B21H 1/04* (2006.01)
*B60B 3/04* (2006.01)

(52) U.S. Cl.
CPC ............. *B21D 53/30* (2013.01); *B21D 22/16* (2013.01); *B21H 1/04* (2013.01); *B60B 3/04* (2013.01)

(58) Field of Classification Search
CPC .................................. B60B 3/04; B21D 53/30
See application file for complete search history.

(56) References Cited

U.S. PATENT DOCUMENTS

| | | | | |
|---|---|---|---|---|
| 3,195,491 A | * | 7/1965 | Bulgrin | B21D 53/265 72/82 |
| 3,262,191 A | * | 7/1966 | Albertson | B21D 53/26 29/894.325 |
| 5,295,304 A | * | 3/1994 | Ashley, Jr. | B21D 22/16 29/894.323 |
| 5,577,810 A | * | 11/1996 | Abe | B21D 53/26 29/894.323 |

(Continued)

FOREIGN PATENT DOCUMENTS

| | | | | |
|---|---|---|---|---|
| EP | 1167076 A1 | * | 1/2002 | ............ B60B 3/007 |
| JP | 3497792 B2 | * | 2/2004 | |

(Continued)

*Primary Examiner* — Jacob J Cigna
(74) *Attorney, Agent, or Firm* — Oliff PLC

(57) ABSTRACT

A vehicle wheel disc includes a flat plate-shaped hub-mounted part, a cylindrical rim-mounted part, and a hat-shaped part. The hat-shaped part includes a hat top portion, a hat inner peripheral portion, and a hat outer peripheral portion. At a border between the hub-mounted part and the hat inner peripheral portion, a first connecting portion is provided, and at a border between the hat top portion and the hat outer peripheral portion, a second connecting portion is provided. The plate thickness of the hat outer peripheral portion is smaller than the plate thickness of an intermediate portion that is a portion from a border between the first connecting portion and the hat inner peripheral portion to a border between the hat top portion and the second connecting portion in the disc radial direction.

4 Claims, 20 Drawing Sheets

(56) References Cited

U.S. PATENT DOCUMENTS

| | | | | |
|---|---|---|---|---|
| 6,839,967 | B2* | 1/2005 | Abe | B21D 53/32 |
| | | | | 29/894.325 |
| 9,511,623 | B2* | 12/2016 | Abe | B60B 3/045 |
| 10,266,004 | B2* | 4/2019 | Vorbeck | B60B 3/12 |
| 2012/0117806 | A1 | 5/2012 | Zhang | |
| 2015/0001913 | A1* | 1/2015 | Abe | B21D 35/006 |
| | | | | 301/63.101 |
| 2017/0232498 | A1* | 8/2017 | Zhang | B21D 53/30 |
| | | | | 29/894.353 |
| 2019/0076910 | A1* | 3/2019 | Tang | B23K 9/16 |
| 2020/0188985 | A1* | 6/2020 | Thiyagarajan | B21D 22/14 |
| 2020/0391541 | A1* | 12/2020 | Thiyagarajan | B21K 19/00 |

FOREIGN PATENT DOCUMENTS

| | | | | |
|---|---|---|---|---|
| JP | 3758780 | B2 | 3/2006 | |
| JP | 5618278 | B2 | 11/2014 | |
| JP | 6299365 | B2 * | 3/2018 | |
| WO | WO-9425198 | A1 * | 11/1994 | B21D 53/265 |

\* cited by examiner

VEHICLE WHEEL DISC AND MANUFACTURING METHOD OF VEHICLE WHEEL DISC

INCORPORATION BY REFERENCE

The disclosure of Japanese Patent Application No. 2018-190573 filed on Oct. 9, 2018 including the specification, drawings and abstract is incorporated herein by reference in its entirety.

BACKGROUND

1. Technical Field

The present disclosure relates to a wheel disc used for a vehicle wheel and to a manufacturing method of this wheel disc.

2. Description of Related Art

Vehicle wheels formed by joining an annular wheel rim to a wheel disc have been conventionally widely known (e.g., see Japanese Patents No. 3758780 and No. 5618278).

SUMMARY

One example of such wheel discs formed from sheet metal and used for vehicle wheels is shown in FIG. 17. This wheel disc includes a flat plate-shaped hub-mounted part 100 to be mounted to a hub of a vehicle, a cylindrical rim-mounted part 200 to be joined to a rim of a wheel, and a hat-shaped part 300 which connects the hub-mounted part 100 and the rim-mounted part 200 to each other in a disc radial direction and of which an entire region in a disc circumferential direction protrudes outward in a disc axial direction.

A wheel disc 2 shown in FIG. 17 can be manufactured, for example, as follows: performing a first drawing process on a flat plate-shaped metal disc material to form a first intermediate shaped body 2a shown in FIG. 18; then performing a second drawing process on the first intermediate shaped body 2a shown in FIG. 18 to form a second intermediate shaped body 2b shown in FIG. 19; and then performing finishing processes including one or more predetermined processes on the second intermediate shaped body 2b shown in FIG. 19 to form a third intermediate shaped body 2c shown in FIG. 20.

The plate thickness of the wheel disc shown in FIG. 17 is substantially constant throughout the entire region in the disc radial direction. Studies conducted by the present inventor have revealed that in a wheel disc including a hub-mounted part, a rim-mounted part, and a hat-shaped part as shown in FIG. 17, there are, in the disc radial direction, a portion at which reducing the plate thickness is more likely to cause a decrease in the rigidity of the wheel disc as a whole and a portion at which reducing the plate thickness is less likely to cause a decrease in the rigidity of the wheel disc as a whole.

This means that adjusting the distribution of the plate thickness in the disc radial direction has the potential to reduce the weight of the wheel disc as a whole without causing a significant decrease in the rigidity of the wheel disc as a whole.

The present disclosure provides a wheel disc that includes a hub-mounted part, a rim-mounted part, and a hat-shaped part and can achieve a weight reduction as a whole without a significant decrease in the rigidity as a whole, and a manufacturing method of this wheel disc.

A vehicle wheel disc according to a first aspect of the present disclosure includes: a hub-mounted part having a shape of a flat plate extending in a disc radial direction that is to be mounted to a hub of a vehicle; a rim-mounted part having a shape of a cylinder extending in a disc axial direction that is to be joined to a rim of a wheel; and a hat-shaped part which connects the hub-mounted part and the rim-mounted part to each other in the disc radial direction and of which an entire region in a disc circumferential direction protrudes outward in the disc axial direction. The hat-shaped part includes: a hat top portion including only a curved portion that is curved in such a direction as to protrude outward in the disc axial direction as seen in a sectional view in the disc radial direction; a hat inner peripheral portion that connects the hub-mounted part and the hat top portion to each other in the disc radial direction, and slopes outward in the disc axial direction while extending outward in the disc radial direction as seen in a sectional view in the disc radial direction; and a hat outer peripheral portion that connects the hat top portion and the rim-mounted part to each other in the disc radial direction, and slopes inward in the disc axial direction while extending outward in the disc radial direction as seen in a sectional view in the disc radial direction. At a border between the hub-mounted part and the hat inner peripheral portion, a first connecting portion is provided that has a curved shape curved in such a direction as to be depressed inward in the disc axial direction as seen in a sectional view in the disc radial direction. At a border between the hat top portion and the hat outer peripheral portion, a second connecting portion is provided that has a curved shape curved in such a direction as to be depressed inward in the disc axial direction as seen in a sectional view in the disc radial direction. The plate thickness of the hat outer peripheral portion is smaller than the plate thickness of an intermediate portion that is a portion from a border between the first connecting portion and the hat inner peripheral portion to a border between the hat top portion and the second connecting portion in the disc radial direction.

In this configuration, an entire region of the hat outer peripheral portion in the disc radial direction may extend straight as seen in a sectional view in the disc radial direction.

In the above configuration, the plate thickness of the hat outer peripheral portion may be substantially constant throughout the entire region of the hat outer peripheral portion, and the plate thickness of the intermediate portion may be substantially constant throughout an entire region of the intermediate portion.

Studies conducted by the present inventor have revealed that in a wheel disc including a hub-mounted part, a rim-mounted part, and a hat part, the hat outer peripheral portion is a portion at which, compared with other portions in the disc radial direction, reducing the plate thickness is less likely to cause a decrease in the rigidity of the wheel disc as a whole.

In the above configuration, the plate thickness of the hat outer peripheral portion is smaller than the plate thickness of the intermediate portion that constitutes a large part of the wheel disc. Thus, compared with a wheel disc having an aspect that the plate thickness of the hat outer peripheral portion is equal to the plate thickness of the intermediate portion (and further an aspect that the plate thickness of the entire region of the wheel disc in the disc radial direction is constant as shown in FIG. 17), this wheel disc can achieve a weight reduction as a whole without a significant decrease in the rigidity of the wheel disc as a whole.

In the above configuration, a ratio of the plate thickness of the hat outer peripheral portion to the plate thickness of the intermediate portion may be 75% or lower.

Compared with a wheel disc having an aspect that the ratio of the plate thickness of the hat outer peripheral portion to the plate thickness of the intermediate portion is higher than 75%, the wheel disc having this configuration can more reliably achieve a weight reduction as a whole without a significant decrease in the rigidity of the wheel disc as a whole.

In the above configuration, a maximum value of the plate thickness of the hat outer peripheral portion may be smaller than a minimum value of the plate thickness of the intermediate portion.

A first manufacturing method for manufacturing a vehicle wheel disc according to a second aspect of the present disclosure includes: a thinning step of performing a thinning process that is a spinning process or a flow forming process on a flat plate-shaped metal disc material, at a hat-outer-peripheral-portion-corresponding portion that is to be the hat outer peripheral portion later, to form a first intermediate shaped body including a truncated conical portion in which a substantially entire region of a side surface is formed by the hat-outer-peripheral-portion-corresponding portion having a smaller plate thickness than a portion other than the hat-outer-peripheral-portion-corresponding portion and which protrudes outward in a disc axial direction; a first drawing step of performing, on the first intermediate shaped body, a first drawing process of further pulling a portion of the first intermediate shaped body, inward of the hat-outer-peripheral-portion-corresponding portion in the disc radial direction, toward an outside in the disc axial direction, to form a second intermediate shaped body including a truncated conical portion in which a base end-side portion of a side surface is formed by the hat-outer-peripheral-portion-corresponding portion having the smaller plate thickness than the portion other than the hat-outer-peripheral-portion-corresponding portion and which protrudes outward in the disc axial direction; a second drawing step of performing, on the second intermediate shaped body, a second drawing process of pressing a portion of the second intermediate shaped body, inward of the hat-outer-peripheral-portion-corresponding portion in the disc radial direction, toward an inside in the disc axial direction, to form a third intermediate shaped body including a hub-mounted-part-corresponding part that is to be the hub-mounted part later and a hat-shaped-part-corresponding part that is to be the hat-shaped part later; and a finishing step of performing a finishing process including one or more predetermined processes on the third intermediate shaped body to form the vehicle wheel disc.

In this configuration, in the third intermediate shaped body, the hub-mounted-part-corresponding part has a shape of a circular plate extending in the disc radial direction; an entire region of the hat-shaped-part-corresponding part in a disc circumferential direction is shaped so as to protrude outward in the disc axial direction; the hat-outer-peripheral-portion-corresponding portion having the smaller plate thickness than the portion other than the hat-outer-peripheral-portion-corresponding portion is located at a portion corresponding to the hat outer peripheral portion in the hat-shaped-part-corresponding part; and the protruding height of the hat-shaped-part-corresponding part from the hub-mounted-part-corresponding part toward the outside in the disc axial direction is larger than the protruding height of the hat-shaped part from the hub-mounted part toward the outside in the disc axial direction in the vehicle wheel disc.

In the above configuration, the main purpose of performing the thinning step may be to form the hat-outer-peripheral-portion-corresponding portion having a smaller plate thickness than the other portion. The main purpose of performing the first drawing step may be, as preparation for forming the third intermediate shaped body, to increase the length of the portion of the second intermediate shaped body, inward of the hat-outer-peripheral-portion-corresponding portion in the disc radial direction, as seen in a sectional view in the disc radial direction. The main purpose of performing the second drawing step may be to form the third intermediate shaped body.

The overall shape of the third intermediate shaped body in the disc radial direction as seen in a sectional view in the disc radial direction is similar to that of the wheel disc (finished product). In addition, the protruding height of the hat-shaped-part-corresponding part in the third intermediate shaped body is larger than the protruding height of the hat-shaped part in the wheel disc (finished product). This allows the metal material composing the hat-shaped-part-corresponding part to easily move down the sloped surface on the side of the hat inner peripheral portion when the third intermediate shaped body undergoes the drawing process, among the finishing processes, of matching the protruding height of the hat-shaped-part-corresponding part with the protruding height of the hat-shaped part (typically a drawing process performed subsequently to the second drawing step). On the other hand, the hat-outer-peripheral-portion-corresponding portion that has already been hardened by the thinning step before the other portion has, is present on the sloped surface on the side of the hat outer peripheral portion, which makes it difficult for the metal material composing the hat-shaped-part-corresponding part to move down the sloped surface on the side of the hat outer peripheral portion.

Since the metal material thus moves down the sloped surface on the side of the hat inner peripheral portion, it is easy to appropriately secure the plate thickness of the intermediate portion upon completion of the drawing process. In other words, it is easy to realize a distribution of the plate thickness in which the plate thickness of the intermediate portion is larger than the plate thickness of the hat outer peripheral portion (i.e., the distribution of the plate thickness of the vehicle wheel disc according to the present disclosure).

Thus, the first manufacturing method features forming the third intermediate shaped body at an intermediate stage of the manufacturing process. To form the third intermediate shaped body, the thinning step is performed before the first and second drawing steps. Specifically, before the first and second drawing steps that are similar to each other in the arrangement of the step, the thinning step that is greatly different in the arrangement of the step from the first and second drawing steps is performed. Compared with a manufacturing method having an aspect that the thinning step is performed between the first and second drawing steps, this manufacturing method imposes a smaller burden on workers in making arrangements for the manufacturing process as a whole. As a result, it is possible to manufacture the wheel disc using existing manufacturing lines and existing manufacturing facilities and thereby keep the manufacturing cost down.

A second manufacturing method for manufacturing a vehicle wheel disc according to a third aspect of the present disclosure includes: a first drawing step of performing, on a flat plate-shaped metal disc material, a first drawing process of pulling a central portion of the disc material toward an outside in a disc axial direction, to form a first intermediate shaped body including a truncated conical portion protruding outward in the disc axial direction; a thinning step of performing a thinning process that is a spinning process or a flow forming process on the first intermediate shaped body, at a hat-outer-peripheral-portion-corresponding portion that is to be the hat outer peripheral portion later, to form a second intermediate shaped body including a truncated conical portion in which a base end-side portion of a side surface is formed by the hat-outer-peripheral-portion-corresponding portion having a smaller plate thickness than a portion other than the hat-outer-peripheral-portion-corresponding portion and which protrudes outward in the disc axial direction; a second drawing step of performing, on the second intermediate shaped body, a second drawing process of pressing a portion of the second intermediate shaped body, inward of the hat-outer-peripheral-portion-corresponding portion in the disc radial direction, toward an inside in the disc axial direction, to form a third intermediate shaped body including a hub-mounted-part-corresponding part that is to be the hub-mounted part later and a hat-shaped-part-corresponding part that is to be the hat-shaped part later; and a finishing step of performing a finishing process including one or more predetermined processes on the third intermediate shaped body to form the vehicle wheel disc.

In this configuration, in the third intermediate shaped body, the hub-mounted-part-corresponding part has a shape of a circular plate extending in the disc radial direction; an entire region of the hat-shaped-part-corresponding part in a disc circumferential direction is shaped so as to protrude outward in the disc axial direction; the hat-outer-peripheral-portion-corresponding portion having the smaller plate thickness than the portion other than the hat-outer-peripheral-portion-corresponding portion is located at a portion corresponding to the hat outer peripheral portion in the hat-shaped-part-corresponding part; and the protruding height of the hat-shaped-part-corresponding part from the hub-mounted-part-corresponding part toward the outside in the disc axial direction is larger than the protruding height of the hat-shaped part from the hub-mounted part toward the outside in the disc axial direction in the vehicle wheel disc.

The only difference between the first and second manufacturing methods is that in the former the thinning step is performed before the first and second drawing steps while in the latter the thinning step is performed between the first and second drawing steps. Thus, compared with the first manufacturing method, the second manufacturing method imposes a larger burden on workers in making arrangements for the manufacturing process as a whole as described above. In other respects, however, the second manufacturing method can provide the same workings and effects as the first manufacturing method.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
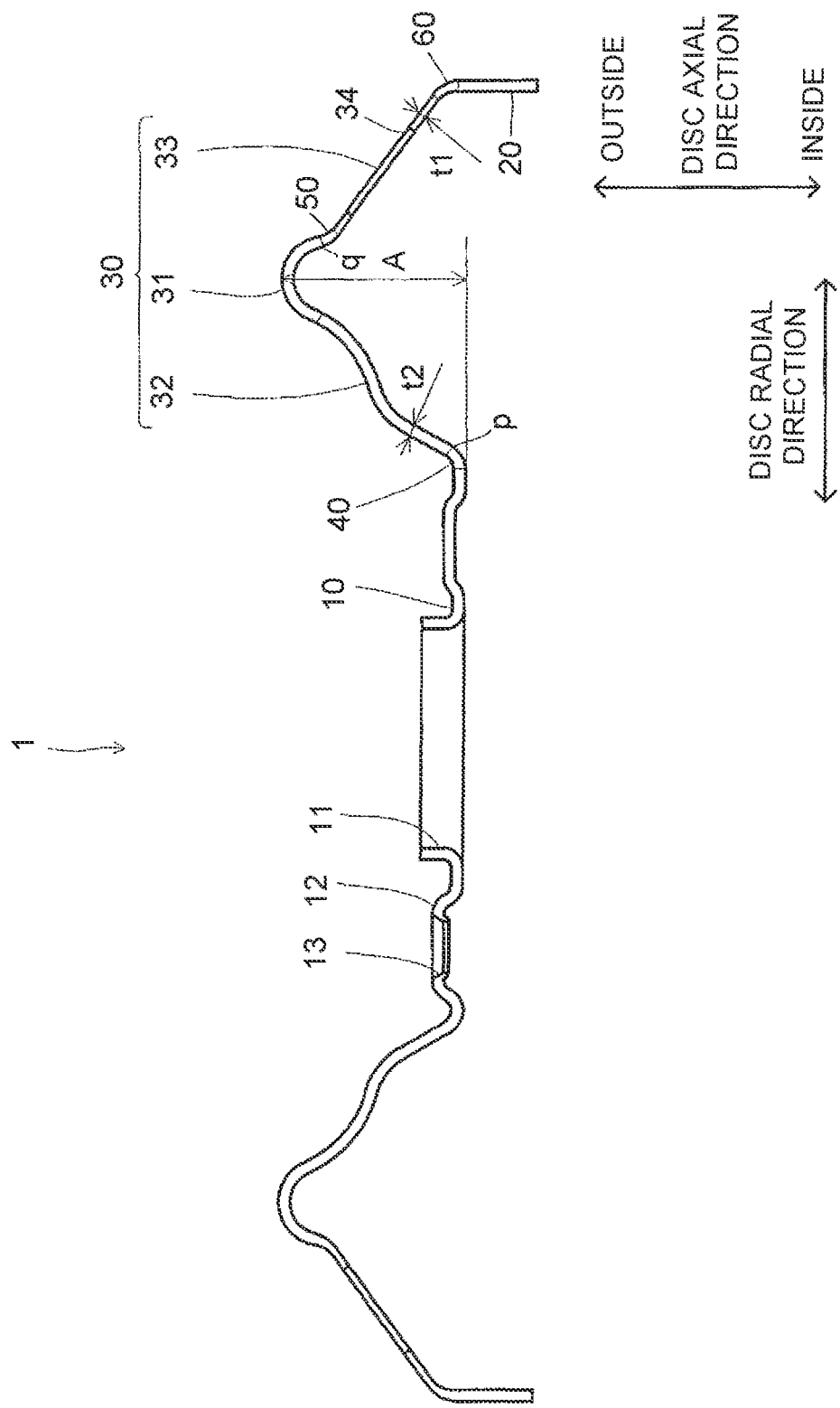
FIG. 1 is a sectional view, in a disc radial direction, of a vehicle wheel disc according to an embodiment of the present disclosure.

A vehicle wheel disc according to an embodiment of the present disclosure will be described below with reference to the drawings. A wheel disc 1 according to the embodiment of the present disclosure shown in FIG. 1 is manufactured from a flat plate-shaped metal disc material. Thus, a vehicle wheel disc is formed from sheet metal. The wheel disc 1 is typically made of steel, but may instead be made of aluminum alloy, titanium alloy, magnesium alloy, or the like. The wheel disc 1 is joined to an annular wheel rim (not shown) to form a vehicle wheel. The wheel disc 1 and the wheel rim are joined together typically by welding, but may instead be joined together by riveting, bonding, or the like.

As shown in FIG. 1, the wheel disc 1 integrally includes a hub-mounted part 10, a rim-mounted part 20, and a hat-shaped part 30. For the convenience of the following description, a disc radial direction and a disc axial direction (and an outside and an inside in the disc axial direction) are defined as shown in FIG. 1. The disc radial direction and the disc axial direction are orthogonal to each other. This definition applies to the other drawings, too.

The hub-mounted part 10 is a part that is to be mounted to a hub (not shown) provided in a tire-wheel assembly of a vehicle, and in this example, the hub-mounted part 10 is a part having a shape of a circular plate extending in the disc radial direction, at a central part of the wheel disc 1 in the disc radial direction. The hub-mounted part 10 has a hub hole 11 (through-hole) formed at a central portion in the disc radial direction. A plurality of bolt mounting portions 12 that rises slightly outward in the disc axial direction is provided in a circle at a portion of the hub-mounted part 10, outward of the hub hole 11 in the disc radial direction, at regular intervals in a disc circumferential direction. Each bolt mounting portion 12 has a bolt hole (through-hole) 13 into which a bolt (not shown) provided in the hub is to be inserted. The wheel disc 1 is fixed to the hub as the bolts provided in the hub are respectively inserted into the bolt holes 13 and engaged with nuts (not shown).

The rim-mounted part 20 is a part that is to be joined to an annular wheel rim (not shown), and in this example, the rim-mounted part 20 is a part having a shape of a cylinder extending inward in the disc axial direction, concentrically with the wheel disc 1, at an outer end of the wheel disc 1 in the disc radial direction. An outer peripheral surface of the rim-mounted part 20 is connected to a predetermined portion of an inner peripheral surface of the wheel rim to produce a vehicle wheel. The rim-mounted part 20 has a shape of a cylinder continuous in the disc circumferential direction in this example, but may instead have a shape of a cylinder that is partially discontinuous in the disc circumferential direction.

The hat-shaped part 30 is a part that is provided between the hub-mounted part 10 and the rim-mounted part 20 in the disc radial direction and connects the hub-mounted part 10 and the rim-mounted part 20 to each other in the disc radial direction. An entire region of the hat-shaped part 30 in the disc circumferential direction is shaped so as to protrude outward in the disc axial direction. The hat-shaped part 30 has a portion that is located outward of the hub-mounted part 10 and the rim-mounted part 20 in the disc axial direction. At least a hat top portion 31 (to be described later) of the hat-shaped part 30 is located outward of the hub-mounted part 10 and the rim-mounted part 20 in the disc axial direction. The shape and position of the hat-shaped part 30 as seen in a sectional view in the disc radial direction (as seen in a view of a section orthogonal to the disc circumferential direction) may be constant or vary to some extent in the disc circumferential direction.

The hat-shaped part 30 is composed of the hat top portion 31, a hat inner peripheral portion 32, and a hat outer peripheral portion 33. The hat top portion 31 is a portion that is located most outward in the disc axial direction in the wheel disc 1, and includes only one or more curved portions that are curved in such a direction as to protrude outward in the disc axial direction as seen in a sectional view in the disc radial direction.

The hat inner peripheral portion 32 is a portion that is provided between the hub-mounted part 10 and the hat top portion 31 in the disc radial direction and connects the hub-mounted part 10 and the hat top portion 31 to each other in the disc radial direction. The hat inner peripheral portion 32 smoothly connects the hub-mounted part 10 and the hat top portion 31 to each other by sloping outward in the disc axial direction while extending outward in the disc radial direction as seen in a sectional view in the disc radial direction. In this example, the hat inner peripheral portion 32 is formed by a combination of curved shapes and straight shapes as seen in a sectional view in the disc radial direction.

The hat outer peripheral portion 33 is a portion that is provided between the hat top portion 31 and the rim-mounted part 20 in the disc radial direction and connects the hat top portion 31 and the rim-mounted part 20 to each other in the disc radial direction. The hat outer peripheral portion 33 smoothly connects the hat top portion 31 and the rim-mounted part 20 to each other by sloping inward in the disc axial direction while extending outward in the disc radial direction as seen in a sectional view in the disc radial direction. In this example, an entire region of the hat outer peripheral portion 33 in the disc radial direction extends straight as seen in a sectional view in the disc radial direction. In this example, a plurality of decorative holes 34 (through-holes) is provided in a circle in the hat outer peripheral portion 33, at regular intervals in the disc circumferential direction.

At a border between the hub-mounted part 10 and the hat inner peripheral portion 32, a first connecting portion 40 is provided that has a curved shape curved in such a direction as to be depressed inward in the disc axial direction as seen in a sectional view in the disc radial direction. At a border between the hat top portion 31 and the hat outer peripheral portion 33, a second connecting portion 50 is provided that has a curved shape curved in such a direction as to be depressed inward in the disc axial direction as seen in a sectional view in the disc radial direction. At a border between the hat outer peripheral portion 33 and the rim-mounted part 20, a third connecting portion 60 is provided that has a curved shape curved in such a direction as to protrude outward in the disc radial direction as seen in a sectional view in the disc radial direction.

As shown in FIG. 1, in the wheel disc 1, (a maximum value of) a plate thickness t1 of the hat outer peripheral portion 33 is smaller than (a minimum value of) a plate thickness t2 of a portion other than the hat outer peripheral portion 33. In this example, the plate thickness t1 of the hat outer peripheral portion 33 (excluding the second connecting portion 50 and the third connecting portion 60) is substantially constant throughout the entire region of the hat outer peripheral portion 33, and the plate thickness t2 of the portion other than the hat outer peripheral portion 33 (excluding the second connecting portion 50 and the third connecting portion 60) is also substantially constant throughout an entire region of the portion other than the hat outer peripheral portion 33.

Thus, when the portion from a border p between the first connecting portion 40 and the hat inner peripheral portion 32 to a border q between the hat top portion 31 and the second connecting portion 50 in the disc radial direction is defined as an "intermediate portion," the plate thickness t2 of the intermediate portion is also substantially constant throughout an entire region of the intermediate portion, and (the maximum value of) the plate thickness t1 of the hat outer peripheral portion 33 is smaller than (the minimum value of) the plate thickness t2 of the intermediate portion. The plate thicknesses of the second connecting portion 50 and the third connecting portion 60 decrease gradually from t2 to t1 toward the hat outer peripheral portion 33.

As will be described later, a thinning process by a spinning process is performed on the hat outer peripheral portion 33, so that the hat outer peripheral portion 33 has a smaller plate thickness than the other portion of the wheel disc 1. Therefore, the hat outer peripheral portion 33 is hardened (has higher bending rigidity) compared with the other portion.

Studies conducted by the present inventor have revealed that in the wheel disc 1 including the hub-mounted part 10, the rim-mounted part 20, and the hat-shaped part 30, the hat outer peripheral portion 33 is a portion at which, compared with the other portion in the disc radial direction, reducing the plate thickness is less likely to cause a decrease in the rigidity of the wheel disc 1 as a whole.

Figure 17:
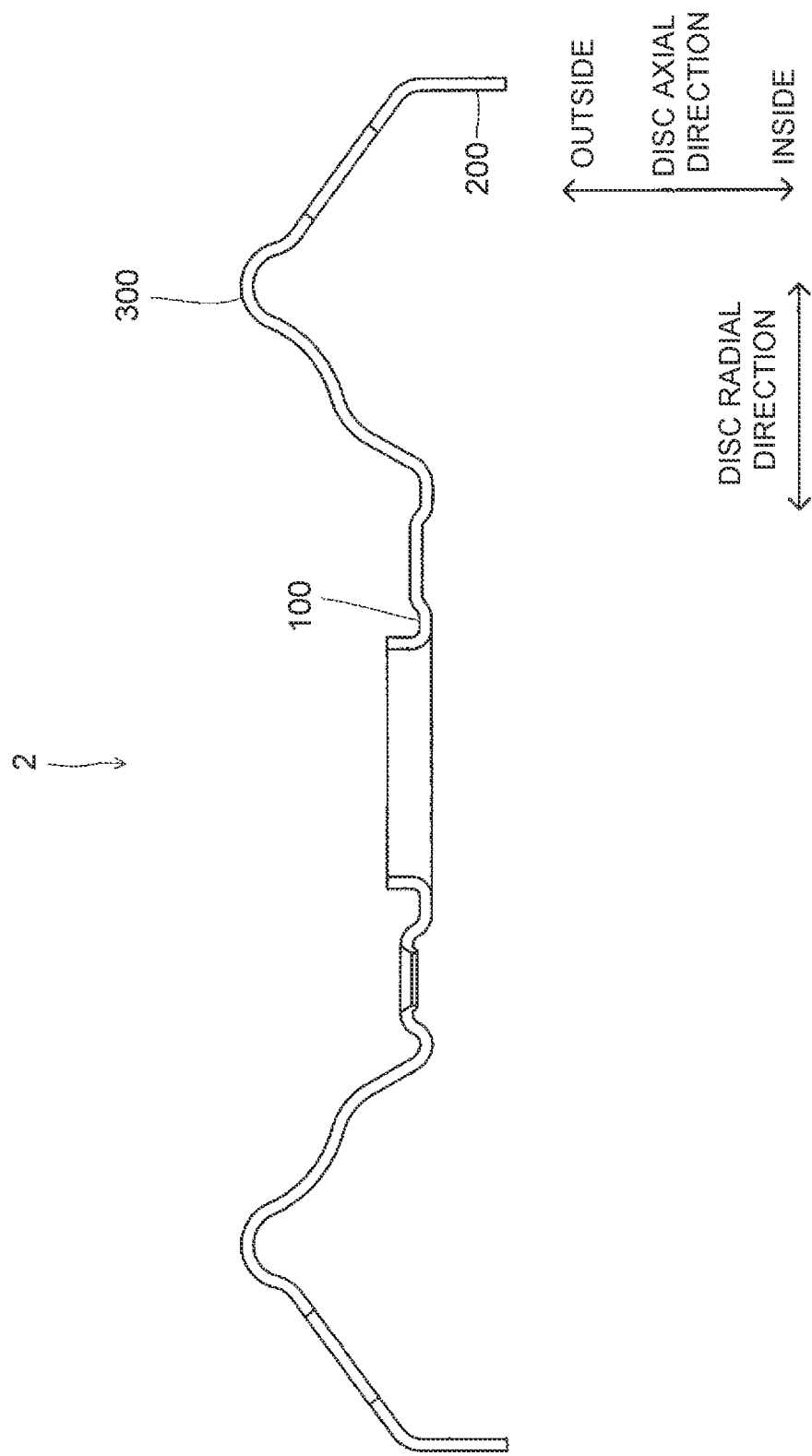
FIG. 17 is a sectional view, in the disc radial direction, of a conventional vehicle wheel disc.

In this regard, in the wheel disc 1, the plate thickness t1 of the hat outer peripheral portion 33 is smaller than the plate thickness t2 of the intermediate portion that constitutes a large part of the wheel disc 1. Thus, compared with a wheel disc having an aspect that the plate thickness of the hat outer peripheral portion 33 is equal to the plate thickness of the intermediate portion (and further an aspect that the plate thickness of the entire region of the wheel disc in the disc radial direction is constant as shown in FIG. 17), the wheel disc 1 can achieve a weight reduction as a whole without a significant decrease in the rigidity of the wheel disc 1 as a whole.

Here, the ratio of the plate thickness t1 of the hat outer peripheral portion 33 to the plate thickness t2 of the intermediate portion may be higher than 75% but is preferably 75% or lower. Thus, compared with a wheel disc having an aspect that the ratio of the plate thickness t1 of the hat outer peripheral portion 33 to the plate thickness t2 of the intermediate portion is higher than 75%, the wheel disc 1 can more reliably achieve a weight reduction as a whole without a significant decrease in the rigidity of the wheel disc 1 as a whole.

Next, a manufacturing method according to the embodiment of the present disclosure for manufacturing the wheel disc 1 having the above-described configuration will be described with reference to FIG. 2 to FIG. 10.

First, a circular plate-shaped metal disc material is prepared. Then, a spinning process (thinning step) is performed on this disc material, at a hat-outer-peripheral-portion-corresponding portion 33z that is to be the hat outer peripheral portion 33 later, to form a first intermediate shaped body 1a shown in FIG. 2.

Figure 2:
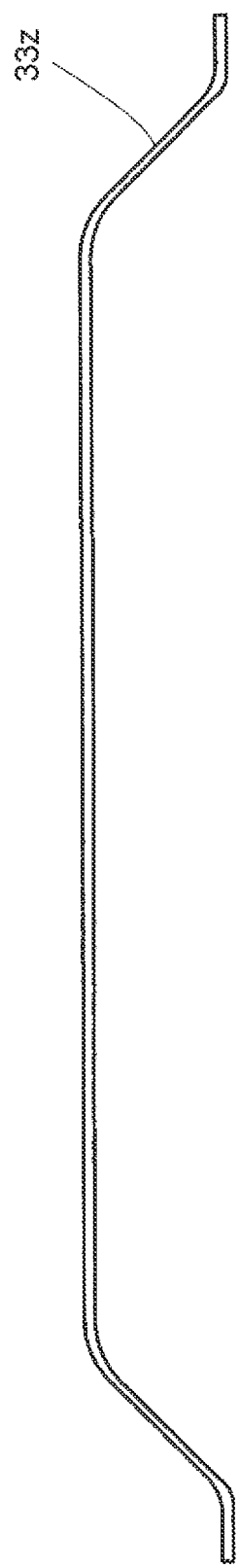
FIG. 2 is a sectional view, in the disc radial direction, of a first intermediate shaped body that is manufactured at a first intermediate stage in a manufacturing process according to a first manufacturing method of the wheel disc shown in FIG. 1.
Figure 7:
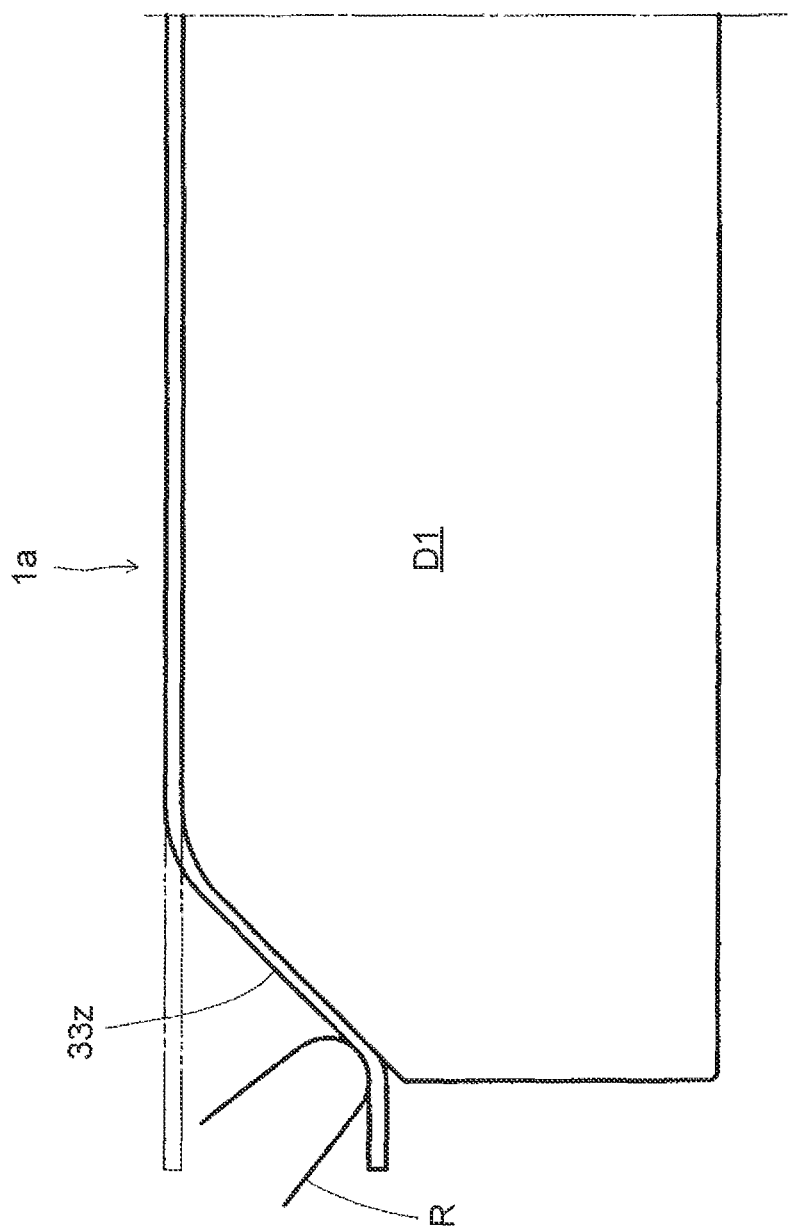
FIG. 7 is a view illustrating a spinning process performed in the first manufacturing method to manufacture the first intermediate shaped body shown in FIG. 2.

As shown in FIG. 7, this spinning process is performed by, in a state where a jig base D1 with the disc material placed thereon is rotated around a central axis, pressing the hat-outer-peripheral-portion-corresponding portion 33z against a sloped surface of a truncated conical shape, formed at an edge of an upper surface of the jig base D1, with a roller R from the outside in the disc axial direction. As a result, as shown in FIG. 2, the first intermediate shaped body 1a has a shape including "a truncated conical portion of which a substantially entire region of a side surface is formed by the hat-outer-peripheral-portion-corresponding portion 33z having a smaller plate thickness than the other portion and which protrudes outward in the disc axial direction." As the thinning process for reducing the thickness of the hat-outer-peripheral-portion-corresponding portion 33z, a so-called flow forming process may be performed instead of the spinning process.

Figure 3:
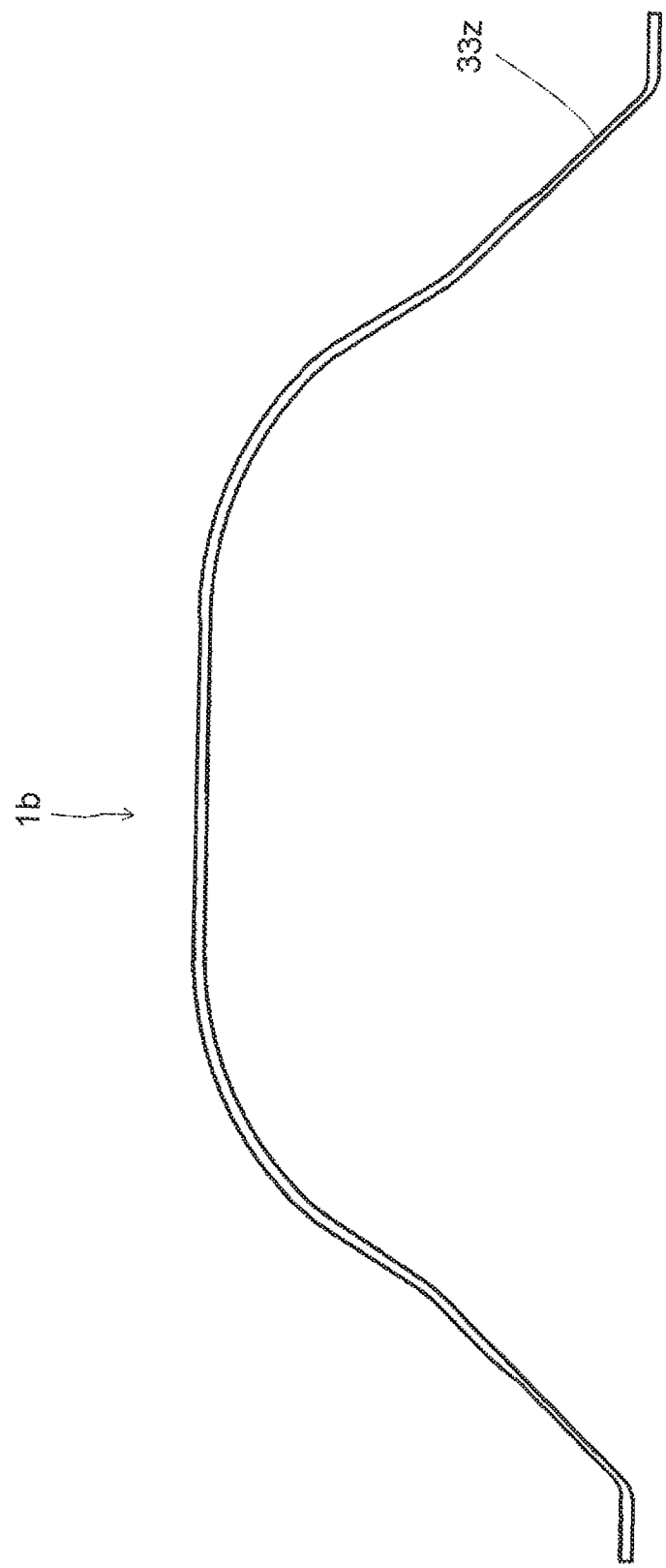
FIG. 3 is a sectional view, in the disc radial direction, of a second intermediate shaped body that is manufactured at a second intermediate stage in the manufacturing process according to the first manufacturing method of the wheel disc shown in FIG. 1.

Next, a first drawing process (first drawing step) of further pulling a portion of the first intermediate shaped body 1a, inward of the hat-outer-peripheral-portion-corresponding portion 33z in the disc radial direction, toward the outside in the disc axial direction is performed on the first intermediate shaped body 1a to form a second intermediate shaped body 1b shown in FIG. 3.

Figure 8:
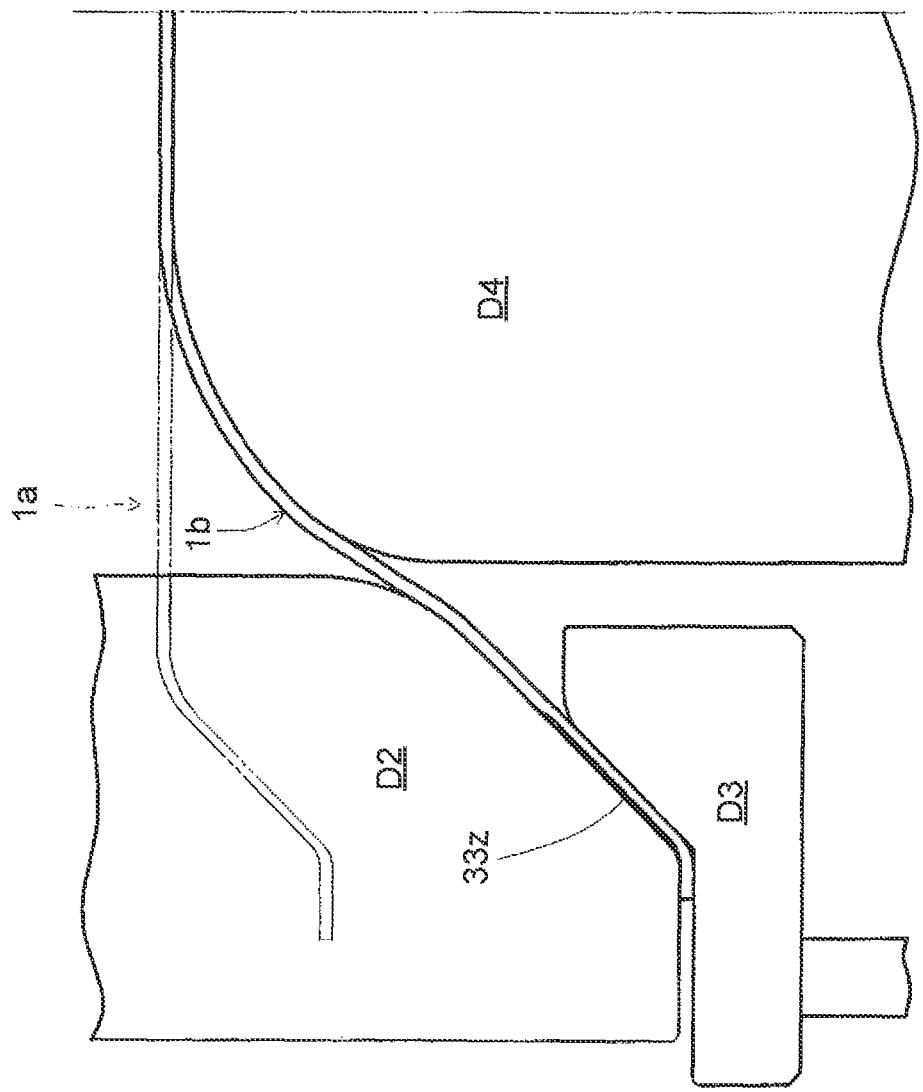
FIG. 8 is a view illustrating a first drawing process performed in the first manufacturing method to manufacture the second intermediate shaped body shown in FIG. 3.

As shown in FIG. 8, this first drawing process is performed by, in a state where an outer edge of the first intermediate shaped body 1a is held between a jig base D2 and a jig base D3 in the disc axial direction, further pulling the portion of the first intermediate shaped body 1a, inward of the hat-outer-peripheral-portion-corresponding portion 33z in the disc radial direction, toward the outside in the disc axial direction by using a jig base D4. As a result, as shown in FIG. 3, the second intermediate shaped body 1b has a shape including "a truncated conical portion of which a base end-side portion of a side surface (a portion thereof on the inside in the disc axial direction) is formed by the hat-outer-peripheral-portion-corresponding portion 33z having a smaller plate thickness than the other portion and which protrudes outward in the disc axial direction."

Figure 4:
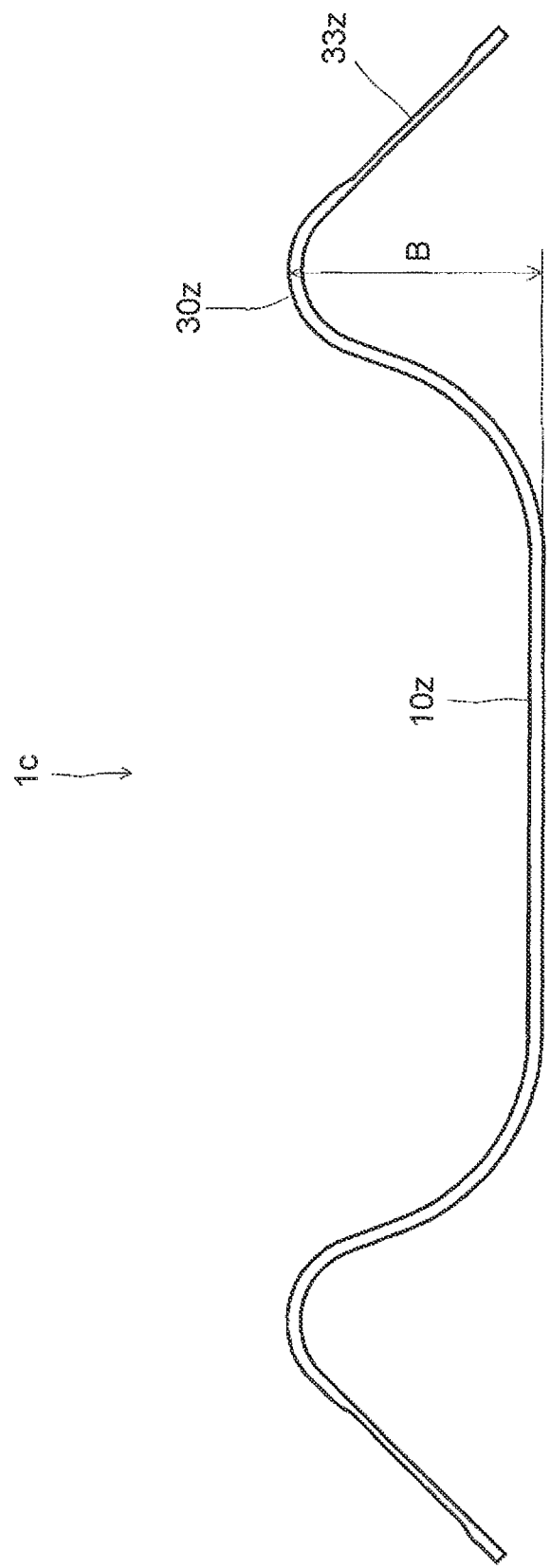
FIG. 4 is a sectional view, in the disc radial direction, of a third intermediate shaped body that is manufactured at a third intermediate stage in the manufacturing process according to the first manufacturing method of the wheel disc shown in FIG. 1.

Next, a second drawing process (second drawing step) of pressing a portion of the second intermediate shaped body 1b, inward of the hat-outer-peripheral-portion-corresponding portion 33z in the disc radial direction, toward the inside in the disc axial direction is performed on the second intermediate shaped body 1b to form a third intermediate shaped body 1c shown in FIG. 4.

Figure 9:
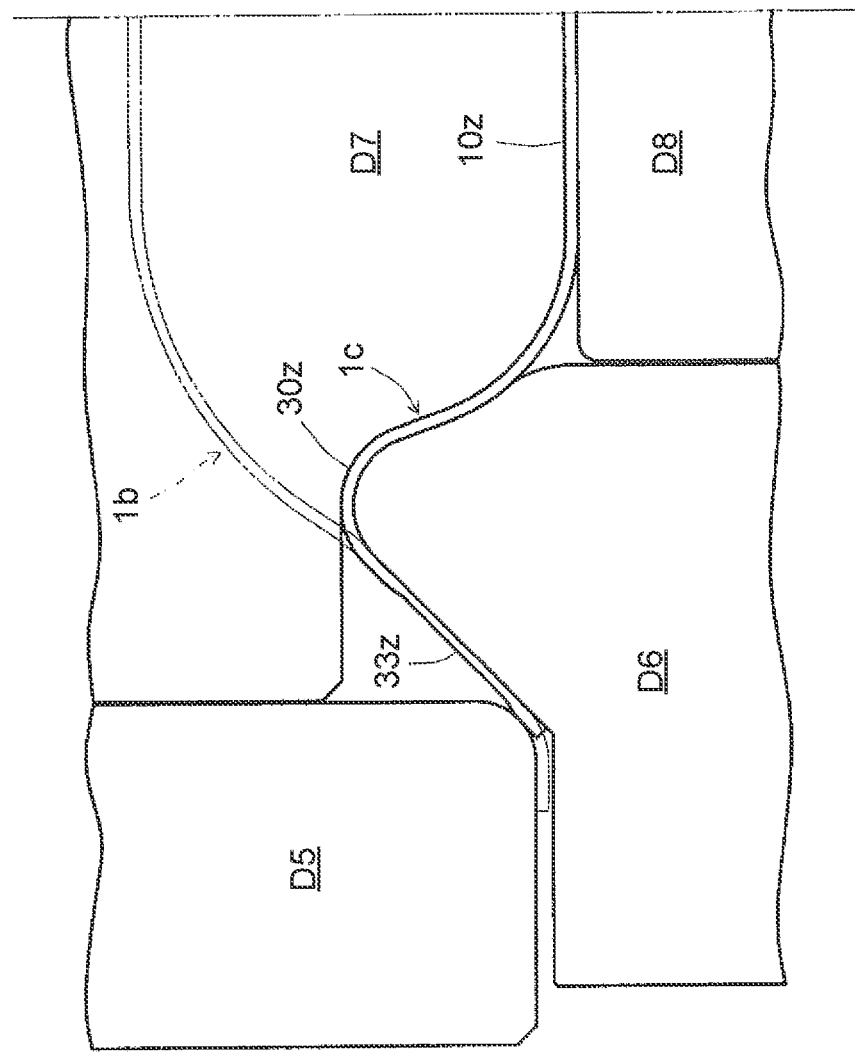
FIG. 9 is a view illustrating a second drawing process performed in the first manufacturing method to manufacture the third intermediate shaped body shown in FIG. 4.

As shown in FIG. 9, this second drawing process is performed by, in a state where an outer edge of the second intermediate shaped body 1b is held between a jig base D5 and a jig base D6 in the disc axial direction, pressing the portion of the second intermediate shaped body 1b, inward of the hat-outer-peripheral-portion-corresponding portion 33z in the disc radial direction, toward the inside in the disc axial direction while holding this portion between a jig base D7 and a jig base D8 in the disc axial direction.

As a result, as shown in FIG. 4, the third intermediate shaped body 1c has a shape including a hub-mounted-part-corresponding part 10z that is to be the hub-mounted part 10 later and a hat-shaped-part-corresponding part 30z that is to be the hat-shaped part 30 later. The hub-mounted-part-corresponding part 10z has a shape of a circular plate extending in the disc radial direction. An entire region of the hat-shaped-part-corresponding part 30z in the disc circumferential direction is shaped so as to protrude outward in the disc axial direction. The shape and position of the hat-shaped-part-corresponding part 30z as seen in a sectional view in the disc radial direction are constant along the disc circumferential direction.

The hat-outer-peripheral-portion-corresponding portion 33z having a smaller plate thickness than the other portion is located at a portion corresponding to the hat outer peripheral portion 33 in the hat-shaped-part-corresponding part 30z. As seen in a sectional view in the disc radial direction, an entire region of the hat-outer-peripheral-portion-corresponding portion 33z in the disc radial direction extends straight. The plate thickness of the hat-outer-peripheral-portion-corresponding portion 33z is substantially constant throughout the entire region of the hat-outer-peripheral-portion-corresponding portion 33z, and is nearly equal to the plate thickness t1 of the wheel disc 1 (finished product). The plate thickness of the portion other than the hat-outer-peripheral-portion-corresponding portion 33z is also substantially constant throughout an entire region of the portion other than the hat-outer-peripheral-portion-corresponding portion 33z, and is nearly equal to the plate thickness t2 of the wheel disc 1 (finished product).

A protruding height B (see FIG. 4) of the hat-shaped-part-corresponding part 30z from the hub-mounted-part-corresponding part 10z toward the outside in the disc axial direction is larger than a protruding height A (see FIG. 1) of the hat-shaped part 30 from the hub-mounted part 10 toward the outside in the disc axial direction in the wheel disc 1 (finished product).

Figure 5:
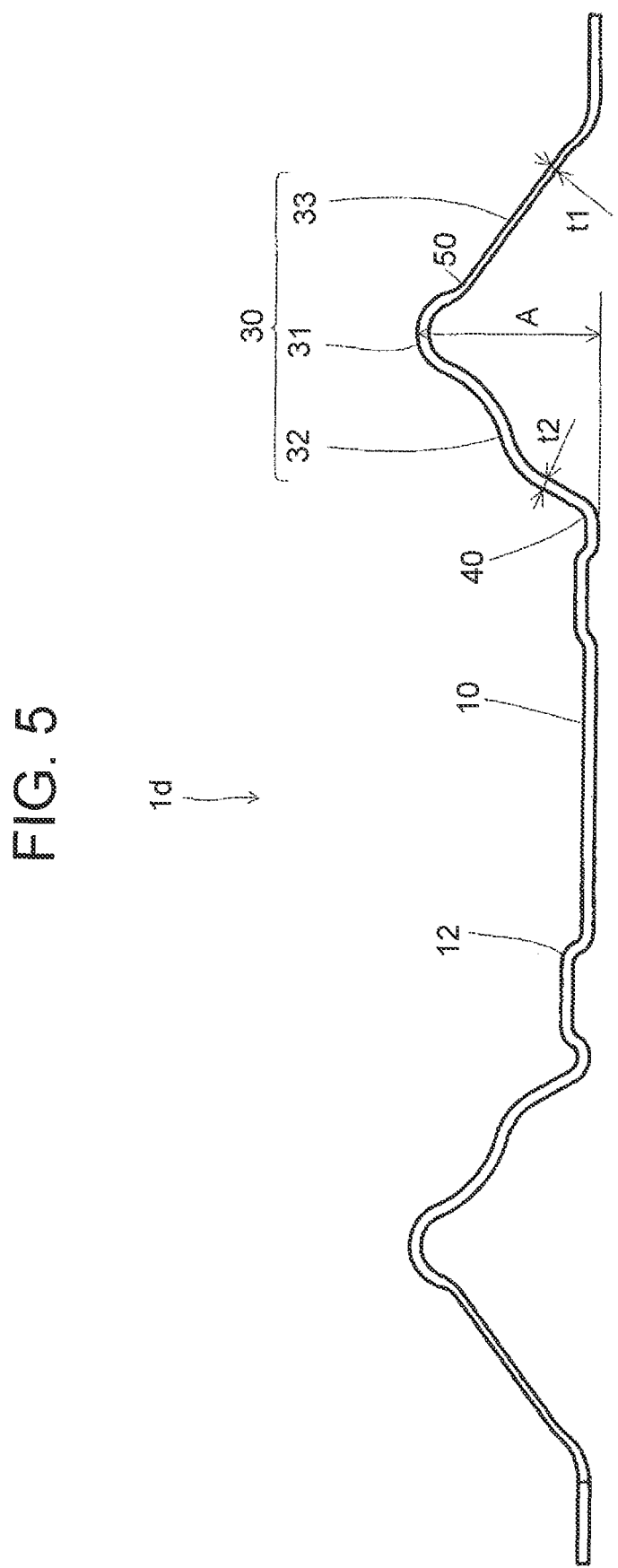
FIG. 5 is a sectional view, in the disc radial direction, of a fourth intermediate shaped body that is manufactured at a fourth intermediate stage in the manufacturing process according to the first manufacturing method of the wheel disc shown in FIG. 1.

Next, a third drawing process corresponding to a first process among finishing processes (a first step among finishing steps) is performed on the third intermediate shaped body 1c to form a fourth intermediate shaped body 1d shown in FIG. 5.

Figure 10:
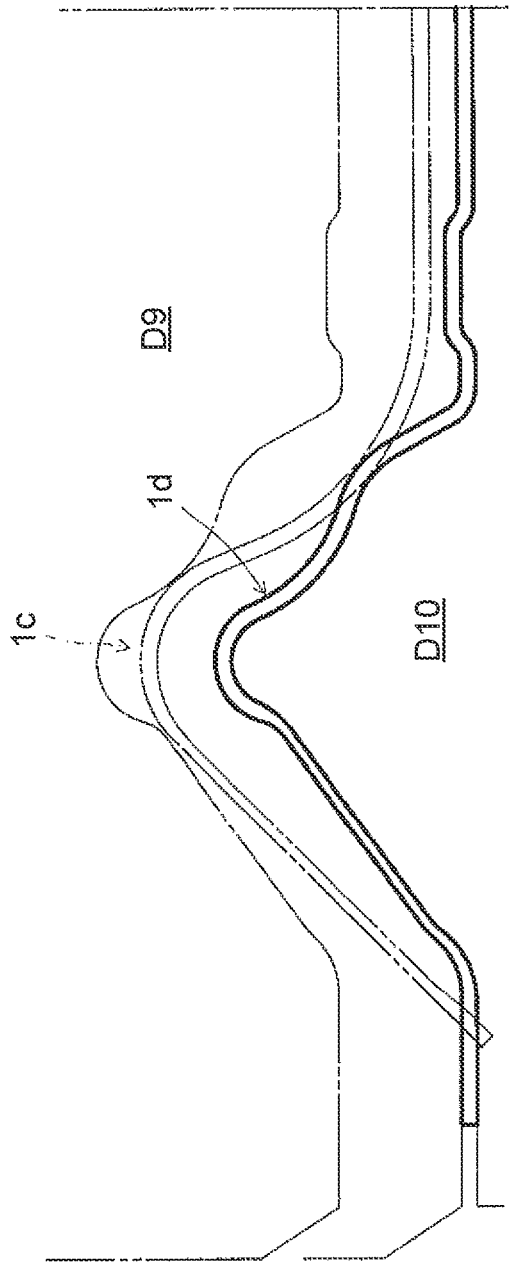
FIG. 10 is a view illustrating a third drawing process performed in the first manufacturing method to manufacture the fourth intermediate shaped body shown in FIG. 5.

As shown in FIG. 10, this third drawing process is performed by sandwiching the third intermediate shaped body 1c between a jig base D9 and a jig base D10 in the disc axial direction. As a result, as shown in FIG. 5, the fourth intermediate shaped body 1d has formed therein the hub-mounted part 10 (including the bolt mounting portions 12), the rim-mounted part 20, the hat-shaped part 30 (the hat top portion 31, the hat inner peripheral portion 32, and the hat outer peripheral portion 33), the first connecting portion 40, and the second connecting portion 50 that have roughly the same contour shapes as those in the wheel disc 1 (finished product) as seen in a sectional view in the disc radial direction.

Figure 6:
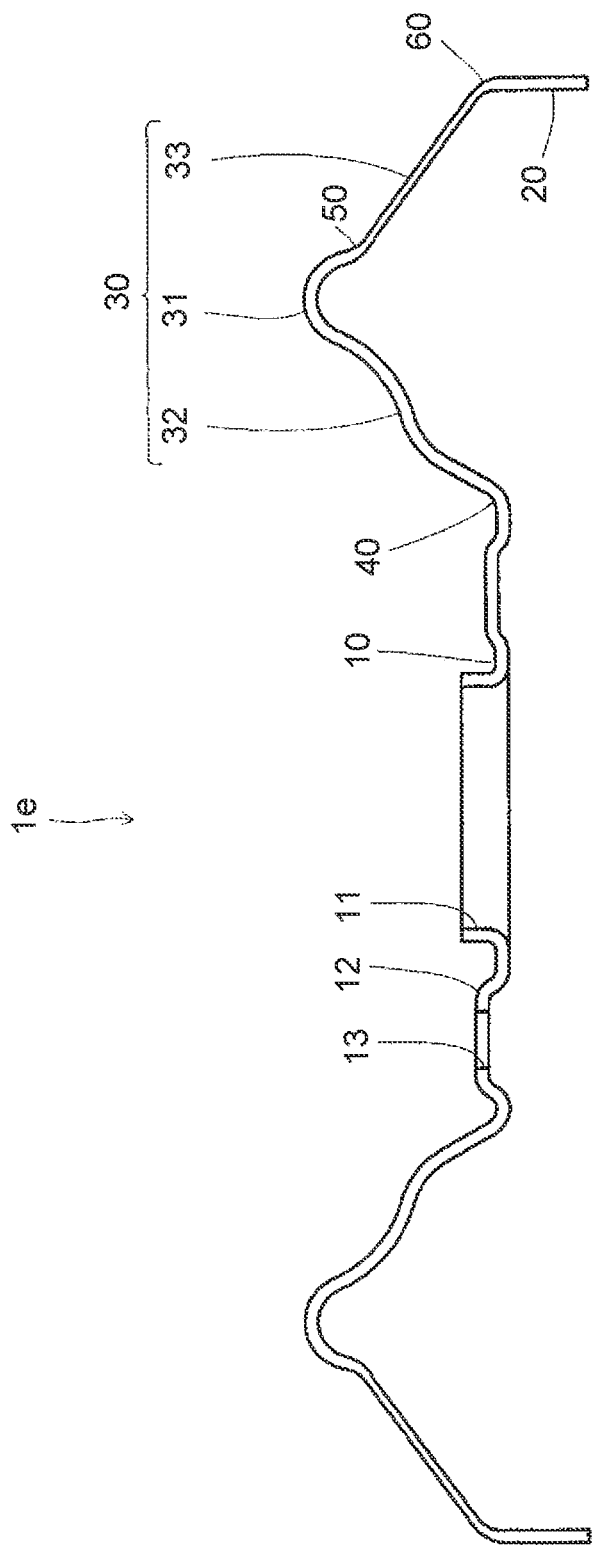
FIG. 6 is a sectional view, in the disc radial direction, of a fifth intermediate shaped body that is manufactured at a fifth intermediate stage in the manufacturing process according to the first manufacturing method of the wheel disc shown in FIG. 1.

Next, a fourth drawing process corresponding to a second process among the finishing processes (a second step among the finishing steps; a so-called restriking process) is performed on the fourth intermediate shaped body 1d to form a fifth intermediate shaped body 1e shown in FIG. 6. Compared with the fourth intermediate shaped body 1d, the fifth intermediate shaped body 1e further has formed therein the hub hole 11, the bolt holes 13, the rim-mounted part 20, and the third connecting portion 60 that have roughly the same contour shapes as those in the wheel disc 1 (finished product) as seen in a sectional view in the disc radial direction. Between the third drawing process and the fourth drawing process, a process of drilling a pilot hole for the hub hole 11 and trimming an outer edge of the pilot hole may be performed on the fourth intermediate shaped body 1d.

Then, one or more final processes among the finishing processes (a step including a final step among the finishing steps) are performed on the fifth intermediate shaped body 1e to form the decorative holes 34, and coining is performed on an inner peripheral edge of the bolt holes 13. As a result, the wheel disc 1 (finished product) shown in FIG. 1 is produced.

In the manufacturing method of the wheel disc 1 according to the above embodiment, the main purpose of performing the spinning process (see FIG. 7) is to form the hat-outer-peripheral-portion-corresponding portion 33z having a smaller plate thickness than the other portion. The main purpose of performing the first drawing process (see FIG. 8) is, as preparation for forming the third intermediate shaped body 1c (see FIG. 4), to increase the length of the portion of the second intermediate shaped body 1b, inward of the hat-outer-peripheral-portion-corresponding portion 33z in the disc radial direction, as seen in a sectional view in the disc radial direction. The main purpose of performing the second drawing step (see FIG. 9) is to form the third intermediate shaped body 1c.

The overall shape of the third intermediate shaped body 1c in the disc radial direction as seen in a sectional view in the disc radial direction is similar to that of the wheel disc 1 (finished product) (comparison between FIG. 1 and FIG. 4). In addition, the protruding height B (see FIG. 4) of the hat-shaped-part-corresponding part 30z in the third intermediate shaped body 1c is larger than the protruding height A (see FIG. 1) of the hat-shaped part 30 in the wheel disc 1 (finished product).

This allows the metal material composing the hat-shaped-part-corresponding part 30z to easily move down the sloped surface on the side of the hat inner peripheral portion 32 when the third intermediate shaped body 1c undergoes the third drawing process (see FIG. 10; the drawing process, among the finishing processes, of matching the protruding height of the hat-shaped-part-corresponding part 30z with the protruding height of the hat-shaped part 30). On the other hand, the hat-outer-peripheral-portion-corresponding portion 33z that has already been hardened by the thinning process before the other portion has, is present on the sloped surface on the side of the hat outer peripheral portion 33, which makes it difficult for the metal material composing the hat-shaped-part-corresponding part 30 to move down the sloped surface on the side of the hat outer peripheral portion 33.

Since the metal material thus moves down the sloped surface on the side of the hat inner peripheral portion 32 in the course of the third drawing process, it is easy to appropriately secure the plate thickness t2 of the intermediate portion upon completion of the third drawing process. In other words, it is easy to realize a distribution of the plate thickness in which the plate thickness t2 of the intermediate portion is larger than the plate thickness t1 of the hat outer peripheral portion 33 (i.e., the distribution of the plate thickness of the wheel disc 1).

Thus, the manufacturing method according to the above embodiment features forming the third intermediate shaped body 1c (see FIG. 4) at an intermediate stage of the manufacturing process. To form the third intermediate shaped body 1c, the spinning process is performed before the first and second drawing processes. Specifically, before the first and second drawing processes that are similar to each other in the arrangement of the step, the spinning process that is greatly different in the arrangement of the step from the first and second drawing processes is performed. Compared with a manufacturing method having an aspect that the spinning process is performed between the first and second drawing processes, this manufacturing method imposes a smaller burden on workers in making arrangements for the manufacturing process as a whole.

In the manufacturing method according to the above embodiment, however, the wheel disc 1 (finished product) has an impression of the roller R left in an outer surface of the hat outer peripheral portion 33 (a surface thereof on the outside in the disc axial direction) as a result of pressing the roller R from the outside in the disc axial direction during the spinning process.

Figure 18:
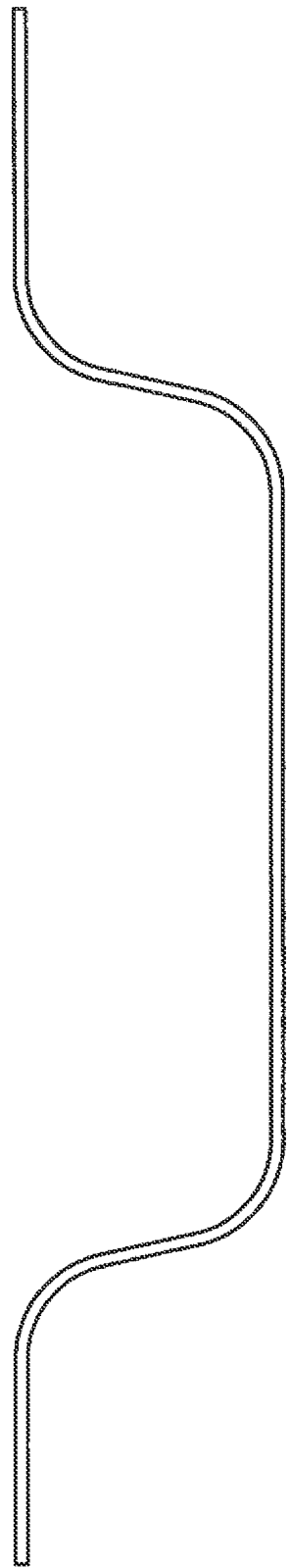
FIG. 18 is a sectional view, in the disc radial direction, of a first intermediate shaped body that is manufactured at a first intermediate stage in a manufacturing process according to a conventional manufacturing method of the wheel disc shown in FIG. 17.
Figure 19:
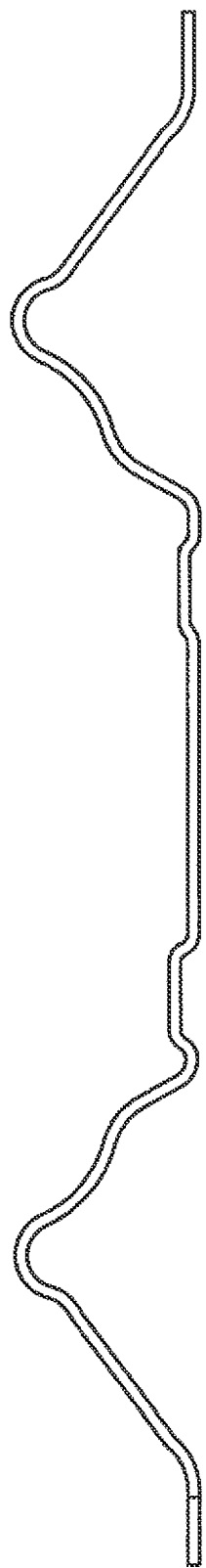
FIG. 19 is a sectional view, in the disc radial direction, of a second intermediate shaped body that is manufactured at a second intermediate stage in the manufacturing process according to the conventional manufacturing method of the wheel disc shown in FIG. 17.
Figure 20:
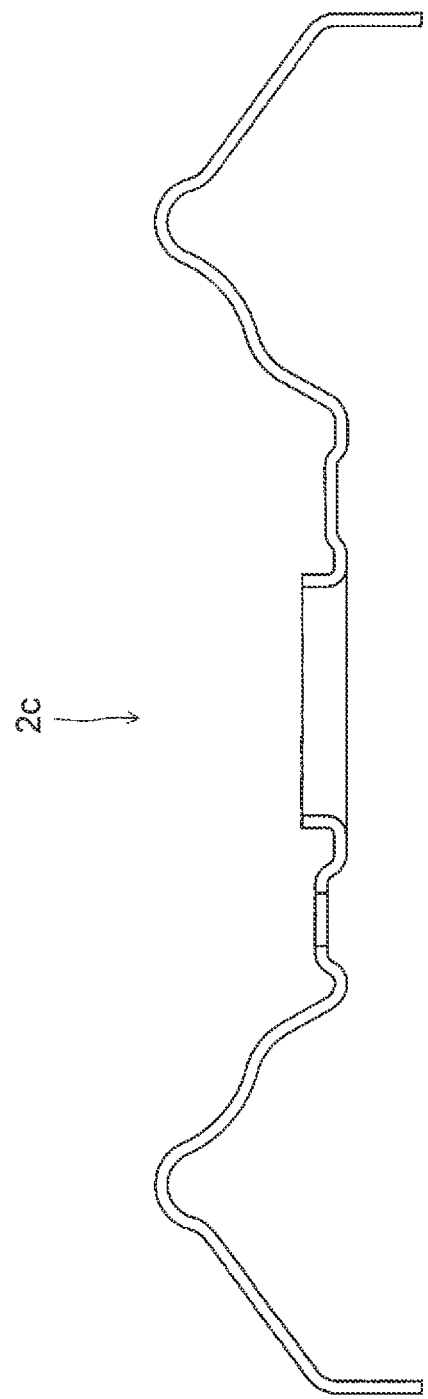
FIG. 20 is a sectional view, in the disc radial direction, of a third intermediate shaped body that is manufactured at a third intermediate stage in the manufacturing process according to the conventional manufacturing method of the wheel disc shown in FIG. 17.

In the manufacturing method according to the above embodiment, the steps subsequent to the third drawing process (see FIG. 5) (i.e., the finishing steps) are the same as those in the conventional manufacturing method described in the section "SUMMARY" The third drawing process (see FIG. 5) in the manufacturing method according to the above embodiment corresponds to the second drawing process (see FIG. 19) in the conventional manufacturing method. In other words, the only difference between the manufacturing method according to the above embodiment and the conventional manufacturing method is that in the former the three steps, namely the spinning process (see FIG. 2), the first drawing process (see FIG. 3), and the second drawing process (see FIG. 4), are performed before the finishing steps, while in the latter only one step, the first drawing process (see FIG. 18), is performed before the finishing steps.

The present disclosure is not limited to the above typical embodiment, and various applications and modifications are conceivable without departing from the object of the present disclosure. For example, the following forms that are applications of the above embodiment can also be adopted.

In the manufacturing method according to the above embodiment, the spinning process is performed before the first and second drawing processes. Alternatively, the spinning process may be performed between the first and second drawing processes. In the following, the first drawing process, the spinning process, and the second drawing process in a manufacturing method according to this modified example will be described with reference to FIG. 11 to FIG. 16.

Figure 11:
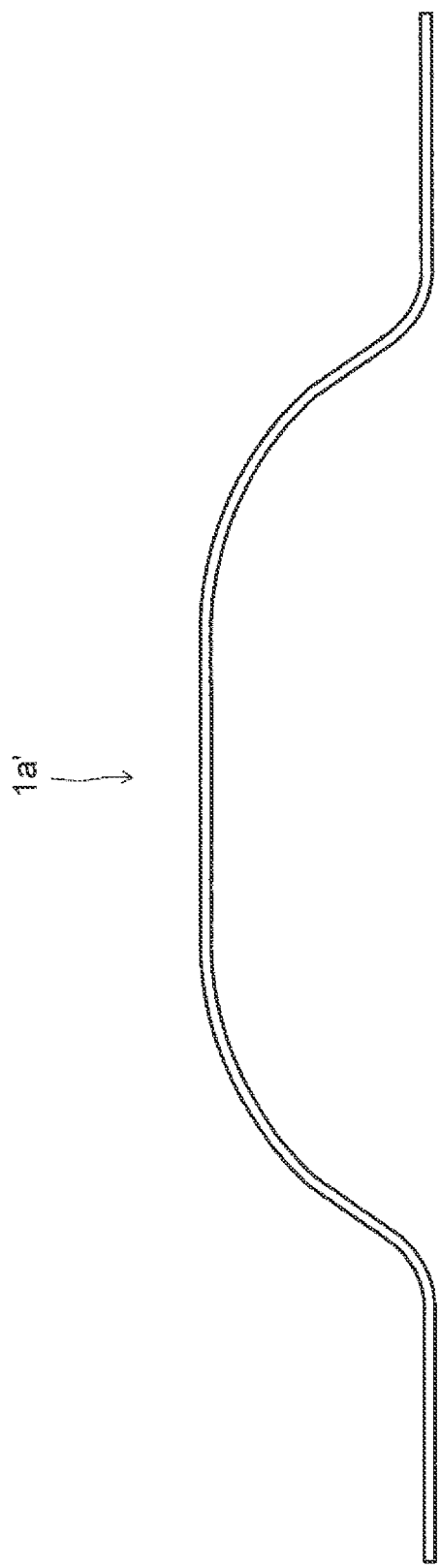
FIG. 11 is a sectional view, in the disc radial direction, of a first intermediate shaped body manufactured at a first intermediate stage in a manufacturing process according to a second manufacturing method of the wheel disc shown in FIG. 1.

In this modified example, the first drawing process (first drawing step) of pulling a central portion of a circular plate-shaped metal disc material toward the outside in the disc axial direction is performed on the disc material to form a first intermediate shaped body 1a' shown in FIG. 11.

Figure 14:
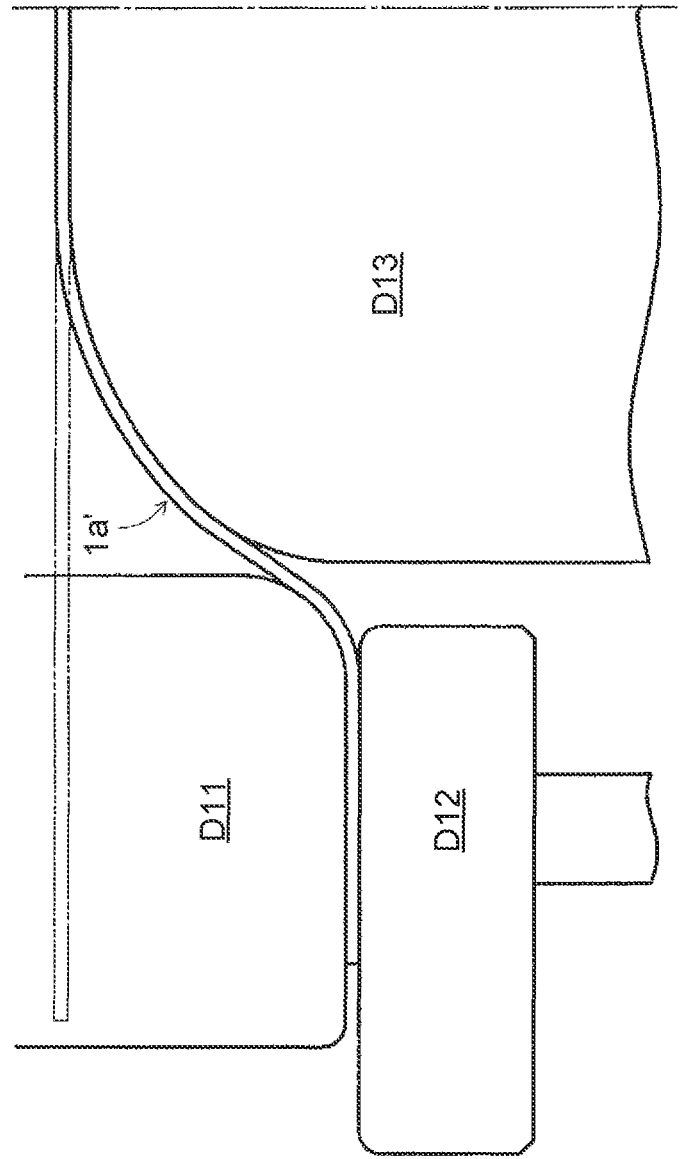
FIG. 14 is a view illustrating a first drawing process performed in the second manufacturing method to manufacture the first intermediate shaped body shown in FIG. 11.

As shown in FIG. 14, this first drawing process is performed by, in a state where an outer edge of the disc material is held between a jig base D11 and a jig base D12 in the disc axial direction, pulling the central portion of the disc material toward the outside in the disc axial direction by using a jig base D13. As a result, as shown in FIG. 11, the first intermediate shaped body 1a' has a shape including "a truncated conical portion protruding outward in the disc axial direction."

Figure 12:
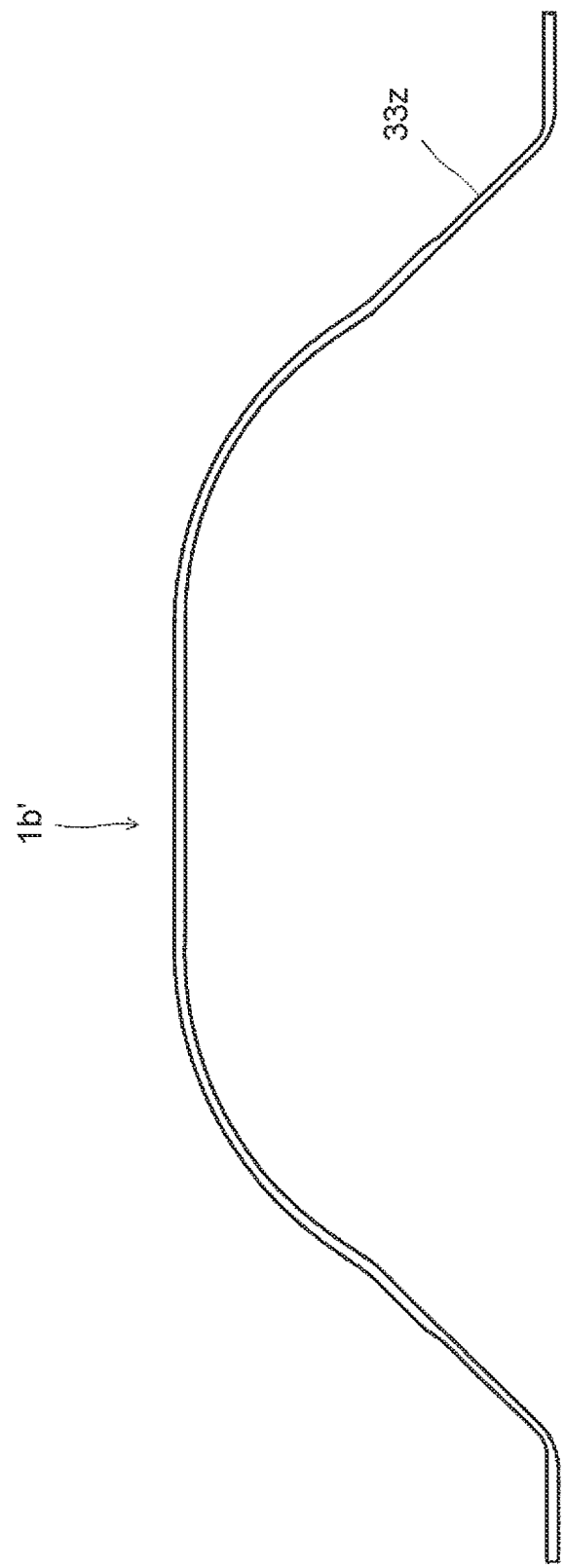
FIG. 12 is a sectional view, in the disc radial direction, of a second intermediate shaped body that is manufactured at a second intermediate stage in the manufacturing process according to the second manufacturing method of the wheel disc shown in FIG. 1.

Next, the spinning process (thinning step) is performed on the first intermediate shaped body 1a', at the hat-outer-peripheral-portion-corresponding portion 33z that is to be the hat outer peripheral portion 33 later, to form a second intermediate shaped body 1b' shown in FIG. 12.

Figure 15:
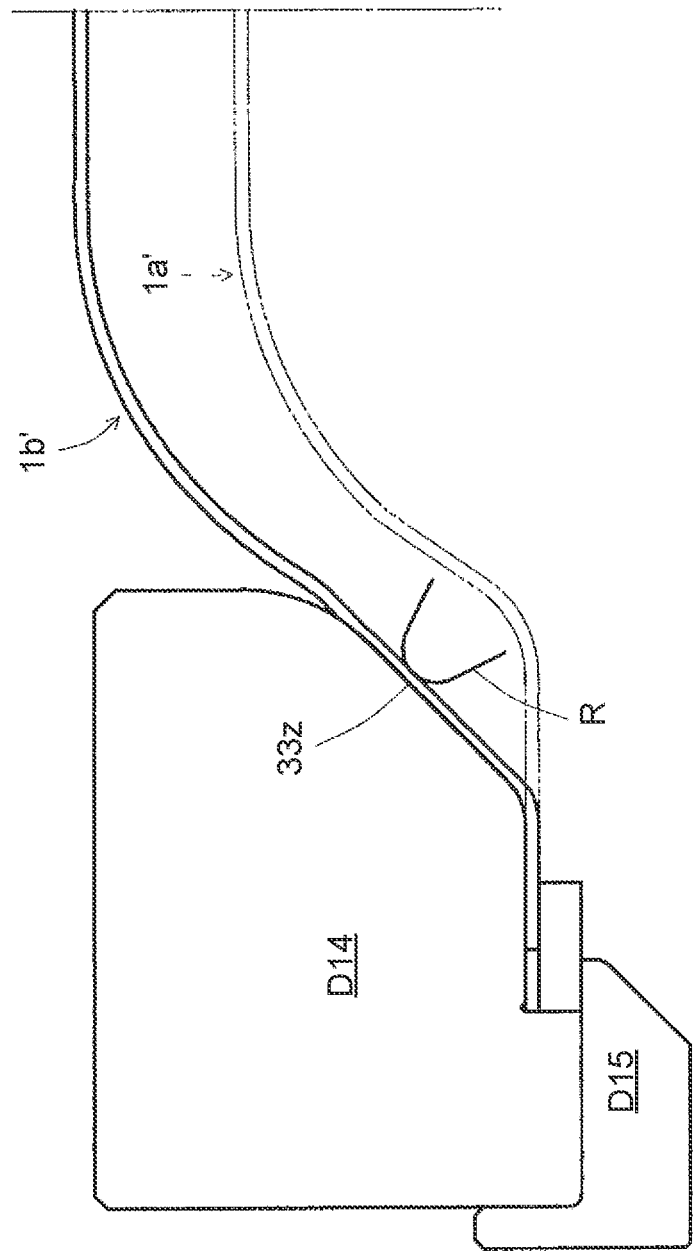
FIG. 15 is a view illustrating a spinning process performed in the second manufacturing method to manufacture the second intermediate shaped body shown in FIG. 12.

As shown in FIG. 15, this spinning process is performed by, in a state where an outer edge of the first intermediate shaped body 1a' is held between a jig base D14 and a jig base D15 in the disc axial direction and the jig base D14 and the jig base D15 are rotated around a central axis, pressing the hat-outer-peripheral-portion-corresponding portion 33z against a sloped surface of a truncated conical shape, formed at an edge of a lower surface of the jig base D14, with a roller R from the inside in the disc axial direction. As a result, as shown in FIG. 12, the second intermediate shaped body 1b' has a shape including "a truncated conical portion of which a base end-side portion of a side surface (a portion thereof on the inside in the disc axial direction) is formed by the hat-outer-peripheral-portion-corresponding portion 33z having a smaller plate thickness than the other portion and which protrudes outward in the disc axial direction." As the thinning process for reducing the thickness of the hat-outer-peripheral-portion-corresponding portion 33z, a so-called flow forming process may be performed instead of the spinning process.

Figure 13:
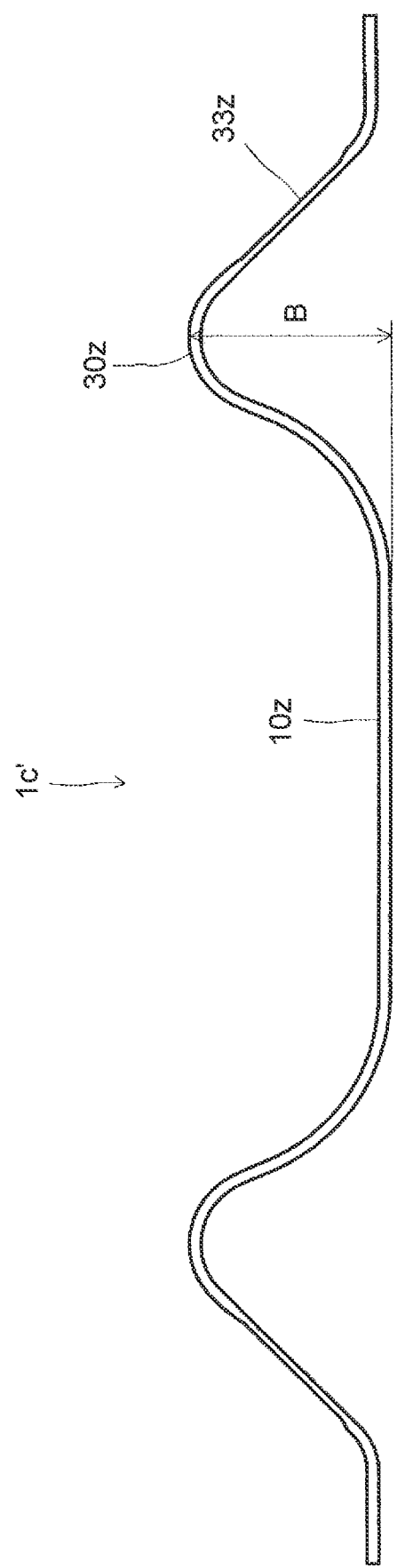
FIG. 13 is a sectional view, in the disc radial direction, of a third intermediate shaped body that is manufactured at a third intermediate stage in the manufacturing process according to the second manufacturing method of the wheel disc shown in FIG. 1.

Next, the second drawing process (second drawing step) of pressing a portion of the second intermediate shaped body 1b', inward of the hat-outer-peripheral-portion-corresponding portion 33z in the disc radial direction, toward the inside in the disc axial direction is performed on the second intermediate shaped body 1b' to form a third intermediate shaped body 1c' shown in FIG. 13.

Figure 16:
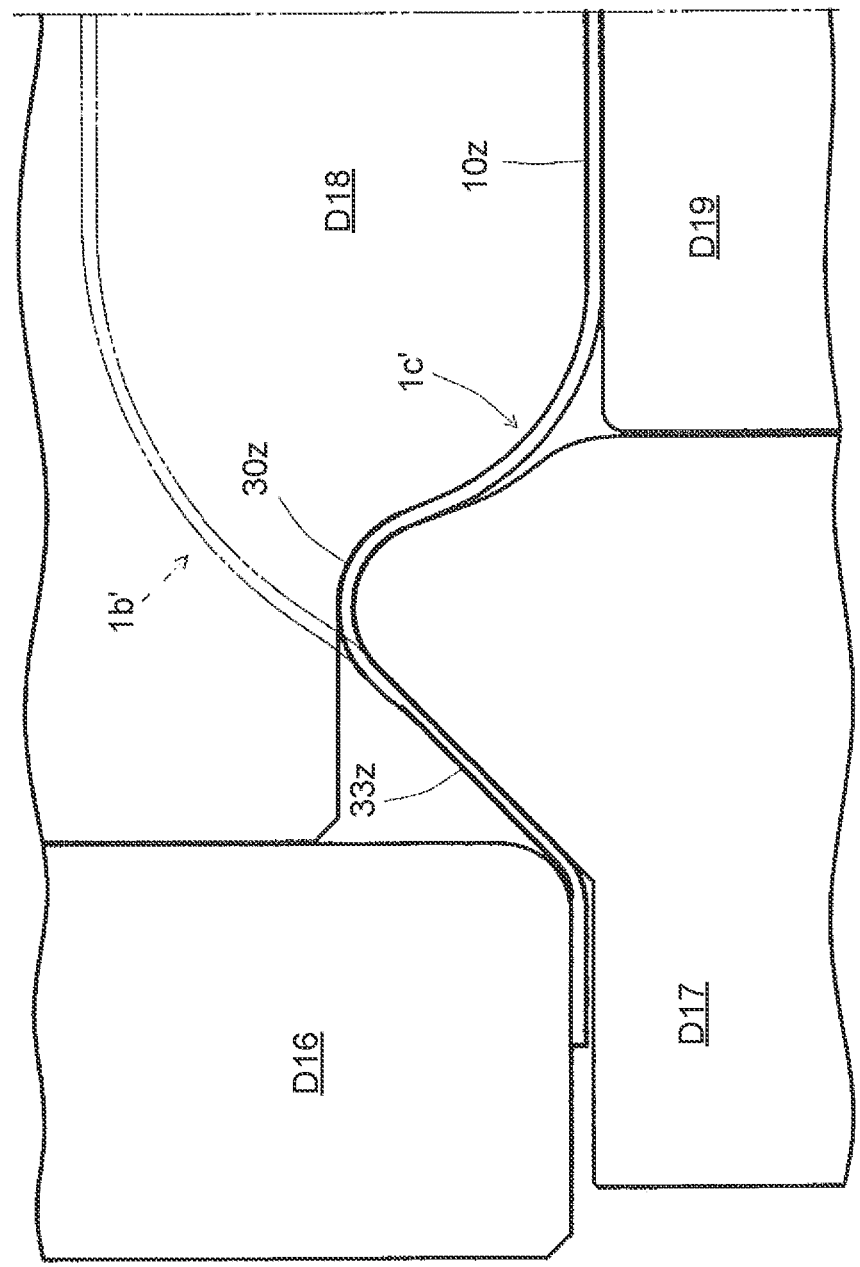
FIG. 16 is a view illustrating a second drawing process performed in the second manufacturing method to manufacture the third intermediate shaped body shown in FIG. 13.

As shown in FIG. 16, this second drawing process is performed by, in a state where an outer edge of the second intermediate shaped body 1b' is held between a jig base D16 and a jig base D17 in the disc axial direction, pressing the portion of the second intermediate shaped body 1b', inward of the hat-outer-peripheral-portion-corresponding portion 33z in the disc radial direction, toward the inside in the disc axial direction while holding this portion between a jig base D18 and a jig base D19 in the disc axial direction.

As a result, as shown in FIG. 13, the third intermediate shaped body 1c' has the same shape as the third intermediate shaped body 1c shown in FIG. 4. Since the third intermediate shaped body 1c' has the same shape as the third intermediate shaped body 1c shown in FIG. 4, a detailed description of the third intermediate shaped body 1c' will be omitted.

In this modified example, the procedure of the finishing processes performed subsequently to the second drawing process is the same as the procedure of the finishing processes in the manufacturing method according to the above embodiment, and therefore a detailed description of these finishing processes will be omitted.

The only difference between the manufacturing method according to the modified example and the manufacturing method according to the above embodiment is that in the former the spinning process is performed between the first and second drawing processes while in the latter the spinning process is performed before the first and second drawing steps. Thus, compared with the manufacturing method according to the above embodiment, the manufacturing method according to the modified example imposes a larger burden on workers in making arrangements for the manufacturing process as a whole as described above. In other respects, however, the manufacturing method according to the modified example can provide the same workings and effects as the manufacturing method according to the above embodiment.

Moreover, in the manufacturing method according to the modified example, the wheel disc 1 (finished product) does not have an impression of the roller R left in the outer surface of the hat outer peripheral portion 33 (the surface thereof on the outside in the disc axial direction) as a result of pressing the roller R from the inside in the disc axial direction during the spinning process. Therefore, adopting the manufacturing method according to the modified example can improve the appearance of the wheel disc 1 (finished product) compared with adopting the manufacturing method according to the above embodiment.

In the wheel disc 1 according to the above embodiment, the plate thickness t2 of the portion other than the hat outer peripheral portion 33 (excluding the second connecting portion 50 and the third connecting portion 60 and including the intermediate portion) is substantially constant throughout the entire region of the intermediate portion. However, as long as (the maximum value of) the plate thickness t1 of the hat outer peripheral portion 33 is smaller than (the minimum value of) the plate thickness t2 of the intermediate portion, the plate thickness t2 of the portion other than the hat outer peripheral portion 33 (excluding the second connecting portion 50 and the third connecting portion 60) may vary according to the position in the disc radial direction.

In the wheel disc 1 according to the above embodiment, the entire region of the hat outer peripheral portion 33 in the disc radial direction extends straight as seen in a sectional view in the disc radial direction. However, as long as the hat outer peripheral portion 33 slopes inward in the disc axial direction while extending outward in the disc radial direction as seen in a sectional view in the disc radial direction, some regions or the entire region of the hat outer peripheral portion 33 in the disc radial direction may be curved.

What is claimed is:

1. A manufacturing method of a vehicle wheel disc, the manufacturing method comprising: a thinning step of performing a thinning process that is a spinning process or a flow forming process on a flat plate-shaped metal disc material, at a hat-outer-peripheral-portion-corresponding portion that is to be the hat outer peripheral portion later, to form a first intermediate shaped body including a truncated conical portion in which a substantially entire region of a side surface is formed by the hat-outer-peripheral-portion-corresponding portion having a smaller plate thickness than a portion other than the hat-outer-peripheral-portion-corresponding portion and which protrudes outward in a disc axial direction; a first drawing step of performing, on the first intermediate shaped body, a first drawing process of further pulling a portion of the first intermediate shaped body, inward of the hat-outer-peripheral-portion-corresponding portion in the disc radial direction, toward an outside in the disc axial direction, to form a second intermediate shaped body including a truncated conical portion in which a base end-side portion of a side surface is formed by the hat-outer-peripheral-portion-corresponding portion having the smaller plate thickness than the portion other than the hat-outer-peripheral-portion-corresponding portion and which protrudes outward in the disc axial direction; a second drawing step of performing, on the second intermediate shaped body, a second drawing process of pressing a portion of the second intermediate shaped body, inward of the hat-outer-peripheral-portion-corresponding portion in the disc radial direction, toward an inside in the disc axial direction, to form a third intermediate shaped body including a hub-mounted-part-corresponding part that is to be the hub-mounted part later and a hat-shaped-part-corresponding part that is to be the hat-shaped part later; and a finishing step of performing a finishing process including one or more predetermined processes on the third intermediate shaped body to form the vehicle wheel disc.

2. The manufacturing method of the vehicle wheel disc according to claim 1, wherein, in the third intermediate shaped body, the hub-mounted-part-corresponding part has a shape of a circular plate extending in the disc radial direction; an entire region of the hat-shaped-part-corresponding part in a disc circumferential direction is shaped so as to protrude outward in the disc axial direction; the hat-outer-peripheral-portion-corresponding portion having the smaller plate thickness than the portion other than the hat-outer-peripheral-portion-corresponding portion is located at a portion corresponding to the hat outer peripheral portion in the hat-shaped-part-corresponding part; and a protruding height of the hat-shaped-part-corresponding part from the hub-mounted-part-corresponding part toward the outside in the disc axial direction is larger than a protruding height of the hat-shaped part from the hub-mounted part toward the outside in the disc axial direction in the vehicle wheel disc.

3. A manufacturing method of a vehicle wheel disc, the manufacturing method comprising: a first drawing step of performing, on a flat plate-shaped metal disc material, a first drawing process of pulling a central portion of the disc material toward an outside in a disc axial direction, to form a first intermediate shaped body including a truncated conical portion protruding outward in the disc axial direction; a thinning step of performing a thinning process that is a spinning process or a flow forming process on the first intermediate shaped body, at a hat-outer-peripheral-portion-corresponding portion that is to be the hat outer peripheral portion later, to form a second intermediate shaped body including a truncated conical portion in which a base end-side portion of a side surface is formed by the hat-outer-peripheral-portion-corresponding portion having a smaller plate thickness than a portion other than the hat-outer-peripheral-portion-corresponding portion and which protrudes outward in the disc axial direction; a second drawing step of performing, on the second intermediate shaped body, a second drawing process of pressing a portion of the second intermediate shaped body, inward of the hat-outer-peripheral-portion-corresponding portion in the disc radial direction, toward an inside in the disc axial direction, to form a third intermediate shaped body including a hub-mounted-part-corresponding part that is to be the hub-mounted part later and a hat-shaped-part-corresponding part that is to be the hat-shaped part later; and a finishing step of performing a finishing process including one or more predetermined processes on the third intermediate shaped body to form the vehicle wheel disc.

4. The manufacturing method of the vehicle wheel disc according to claim 3, wherein, in the third intermediate shaped body, the hub-mounted-part-corresponding part has a shape of a circular plate extending in the disc radial direction; an entire region of the hat-shaped-part-corresponding part in a disc circumferential direction is shaped so as to protrude outward in the disc axial direction; the hat-outer-peripheral-portion-corresponding portion having the smaller plate thickness than the portion other than the hat-outer-peripheral-portion-corresponding portion is located at a portion corresponding to the hat outer peripheral portion in the hat-shaped-part-corresponding part; and a protruding height of the hat-shaped-part-corresponding part from the hub-mounted-part-corresponding part toward the outside in the disc axial direction is larger than a protruding height of the hat-shaped part from the hub-mounted part toward the outside in the disc axial direction in the vehicle wheel disc.

* * * * *